US005458299A

United States Patent [19]
Collins et al.

[11] Patent Number: 5,458,299
[45] Date of Patent: Oct. 17, 1995

[54] AIRCRAFT DEICING APPARATUS

[76] Inventors: Kenneth Collins, 1511 S. Sieger, Springfield, Mo. 65804; Larry B. Kapp, 402 S. Monte Vista Dr., Springfield, Mo. 65802

[21] Appl. No.: 153,050

[22] Filed: Nov. 17, 1993

[51] Int. Cl.$^6$ .................................................. B64D 15/10
[52] U.S. Cl. ...................................... 244/134 C; 134/123
[58] Field of Search ........................... 244/119 R, 134 R, 244/134 C; 15/302, 320–323; 134/45, 123, 172, 99.1, 99.2, 200

[56]  References Cited

U.S. PATENT DOCUMENTS

| | | | |
|---|---|---|---|
| 2,642,957 | 6/1953 | Watts, Jr. et al. | 244/114 R |
| 2,708,446 | 5/1955 | Phillips | 134/93 |
| 2,769,575 | 11/1956 | Harman et al. | 244/114 R |
| 3,243,123 | 3/1966 | Inghram et al. | 239/124 |
| 3,533,395 | 10/1970 | Yaste | 244/134 C |
| 3,583,637 | 6/1971 | Miscovich | 244/114 R |
| 3,612,075 | 10/1971 | Cook | 134/99 |
| 3,835,498 | 9/1974 | Arato | 15/21 E |
| 4,032,090 | 6/1977 | Thorton-Trump | 244/134 |
| 4,378,755 | 4/1983 | Magnusson et al. | 118/684 |
| 4,634,084 | 1/1987 | Magnusson | 244/134 |
| 4,895,322 | 1/1990 | Zieve | 244/134 |
| 4,898,330 | 2/1990 | Betchan | 239/135 |
| 4,954,279 | 9/1990 | Ma et al. | 252/70 |
| 5,034,380 | 7/1991 | Weisend, Jr. et al. | 244/134 D |
| 5,074,497 | 12/1991 | Phillips, II | 244/134 D |
| 5,104,068 | 4/1992 | Krilla et al. | 244/134 R |
| 5,134,266 | 7/1992 | Peppard | 244/134 R |
| 5,161,753 | 11/1992 | Vice et al. | 244/134 C |
| 5,180,122 | 1/1993 | Christian et al. | 244/134 C |
| 5,354,014 | 10/1994 | Anderson | 134/123 |

FOREIGN PATENT DOCUMENTS 2343389  8/1972  Germany.

OTHER PUBLICATIONS

WO93/09028, Baker et al., 13 May 1993.

*Primary Examiner*—Galen L. Barefoot
*Attorney, Agent, or Firm*—Dickinson, Wright, Moon, Van Dusen & Freeman

[57]  ABSTRACT

An apparatus is provided for chemically deicing aircraft on the taxiway. The apparatus includes a series of nozzles to dispense deicing solution onto the wings of an aircraft, and utilizes photoelectric sensors to detect when the nozzles are appropriately positioned to dispense the deicing solution, thereby conserving deicing solution. Recycling means are provided to collect, purify and concentrate used deicing solution for further use. The apparatus is further provided with extendable telescoping lift cylinders and rotating delivery arms from which the nozzles depend, thereby allowing the device to accommodate aircraft of different dimensions and design.

18 Claims, 10 Drawing Sheets

AIRCRAFT DEICING APPARATUS

FIELD OF THE INVENTION

This invention relates to an apparatus and method for chemically deicing aircraft.

BACKGROUND OF THE INVENTION

The need for deicing aircraft prior to flight has long been recognized. Several mechanical methods have been proposed. For example, U.S. Pat. No. 4,895,322 discloses the use of an electrically induced magnetic force to de-bond ice from the surface of an aircraft. U.S. Pat. No. 5,035,380 teaches a deicer system which features the use of resilient inflatable tubes on the leading edge of an aircraft wing. The tubes break up ice by undergoing a series of inflations and deflations. U.S. Pat. No. 5,074,497 discloses the use of deicer pads on aircraft which physically dislodge ice from an aircraft after being activated by an electromagnetic field pulse generator.

Some methods for chemically deicing aircraft have also been proposed. Glycol solutions are most frequently used for this purpose, though other suitable compositions have been suggested (see, e.g., U.S. Pat. No. 4,954,279). For example, U.S. Pat. No. 4,898,330 teaches the use of a portable hose-and-tank type sprayer to apply a glycol solution to aircraft. U.S. Pat. No. 5,104,068 (Krilla et al) discloses a deicing apparatus featuring sets of nozzles arranged on booms that can be situated above and below the wings of an airplane.

Chemical methods are often preferred for deicing aircraft, partly due to their ease of use and the fact that they can be used without physical modification of the aircraft. However, many known chemical methods are inefficient because they use more solvent than is necessary to deice the aircraft. For example, the apparatus disclosed in U.S. Pat. No. 3,533,395 (Yaste) contains banks of nozzles which discharge a glycol solution. The nozzles are activated all at once, despite the fact that the wing configuration of a particular aircraft may result in some of the nozzles discharging solvent into empty space. The resulting waste of solvent increases the cost of the method and contributes to pollution. If the nozzle bank is tailored to the specifications of a particular aircraft, then the versatility of the apparatus is lost. U.S. Pat. No. 4,898, 330, which features a hand held hose-and-tank type of apparatus, avoids these particular problems, but also lacks the convenience of automation and results in exposure of workers to the toxic solvents typically used to deice airplanes.

Because of the cost and pollution concerns associated with the use of glycol and other deicing solvents, various methods have evolved for recycling glycol after use. For example, U.S. Pat. No. 3,533,395 (Yaste) and U.S. Pat. No. 5,104,068 (Krilla et al) disclose methods for collecting, distilling, separating, filtering, and recycling used glycol and water. However, these methods of recycling glycol have proved inefficient in practice.

Finally, the prior art discloses a variety of deicing devices capable of installation along the taxiway of an airport. However, these devices create a significant runway hazard in that they are permanently installed above the ground. The problem is especially serious in emergency situations or when the airport must service aircraft requiring extra clearance. Mobile deicing units avoid some of these problems, but lack the convenience of permanent deicing units installed along the taxiway.

SUMMARY OF THE INVENTION

The present invention is a retractable apparatus for deicing aircraft on the taxiway of an airport.

One advantage of the present invention is that it may be permanently installed along the taxiway of an airport so as to allow deicing of an aircraft shortly before takeoff. This removes the need for aircraft to return to the tarmac for further treatment when there are takeoff delays, while also reducing the number of accidents resulting from the accumulation of ice on aircraft wings.

A further advantage of the present invention is that it is retractable into the ground. This allows the ground crew to create additional area for aircraft that require extra width on the taxiway without having to disassemble or relocate the device. The retractability also allows for clearance of the device in emergency situations and for storage during periods of clement weather.

A further advantage of the present invention is that it conserves glycol by compensating for different aircraft wing configurations so that there is no overspray.

Still another advantage of the present system is that it efficiently recycles glycol-based deicing solutions at a recovery rate of about 95%, thereby reducing the cost of deicing operations and the amount of pollution resulting from disposal of deicing solutions.

Other features and advantages of the invention will become apparent upon reference to the accompanying drawings.

PREFERRED EMBODIMENTS OF THE INVENTION

Figure 1:
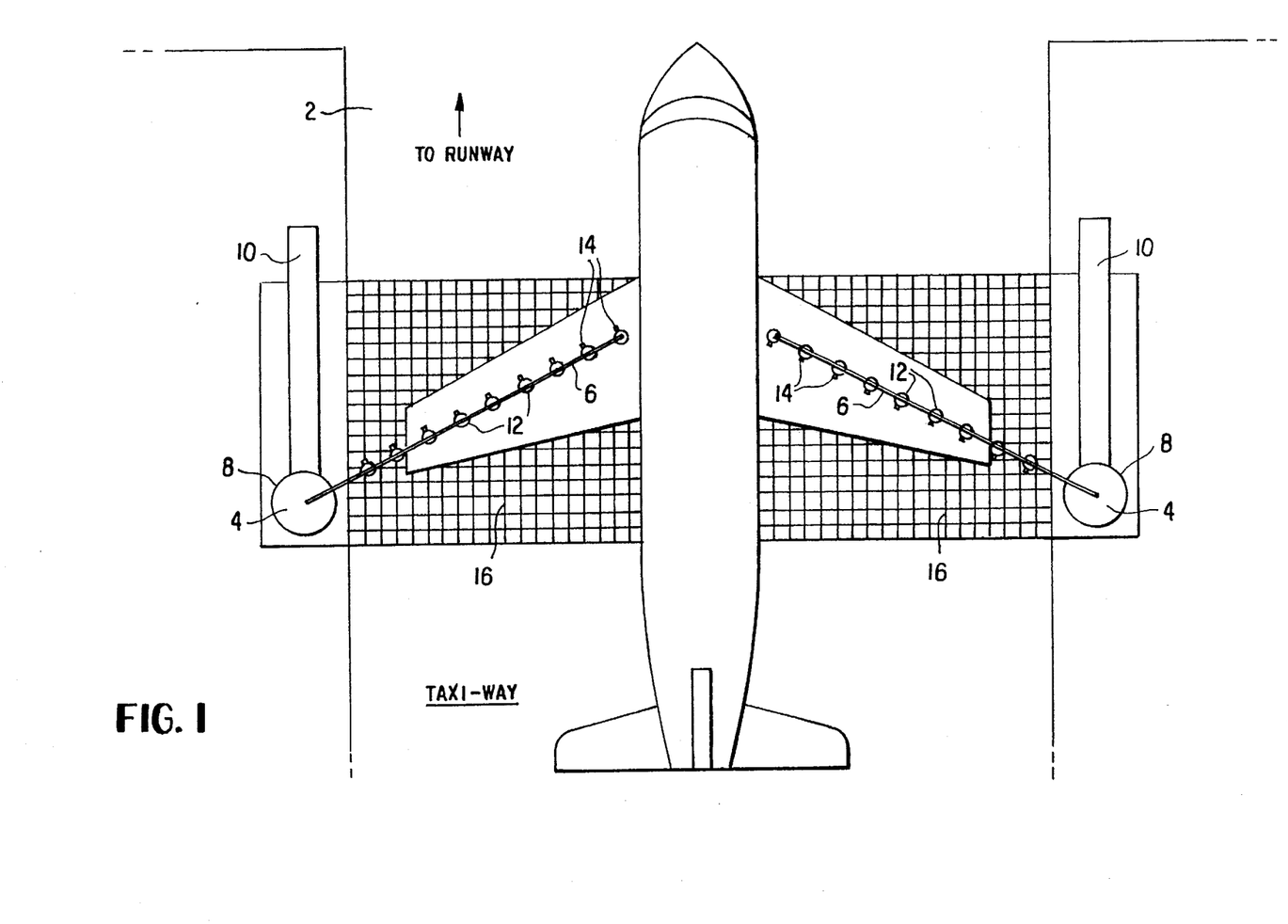
FIG. 1 is a top view of the device of the present invention positioned over the wings of an airplane.

As illustrated in FIG. 1, the deicing apparatus of the present invention is a retractable device which may be installed along the taxiway 2 of an airport to provide deicing services to aircraft just prior to the time at which the aircraft proceed to the runway for takeoff. The positioning of the device along the taxiway eliminates the need for aircraft to return to the ramp for further deicing prior to takeoff, and also minimizes the amount of ice formation on the wings of aircraft prior to takeoff.

The apparatus preferably consists of two telescoping hydraulic cylinders 4, each equipped with a rotating delivery tube 6. In the preferred configuration, one hydraulic cylinder and its associated delivery tube is positioned on each side of the taxiway. The hydraulic cylinders allow for the vertical adjustment of the delivery tubes, and are capable of being retracted into cells 8, 8' set into the ground along the taxiway. Each cell includes a trough 10 which is of appropriately dimensions to accommodate both the hydraulic cylinder and the delivery tubes.

Figure 2:
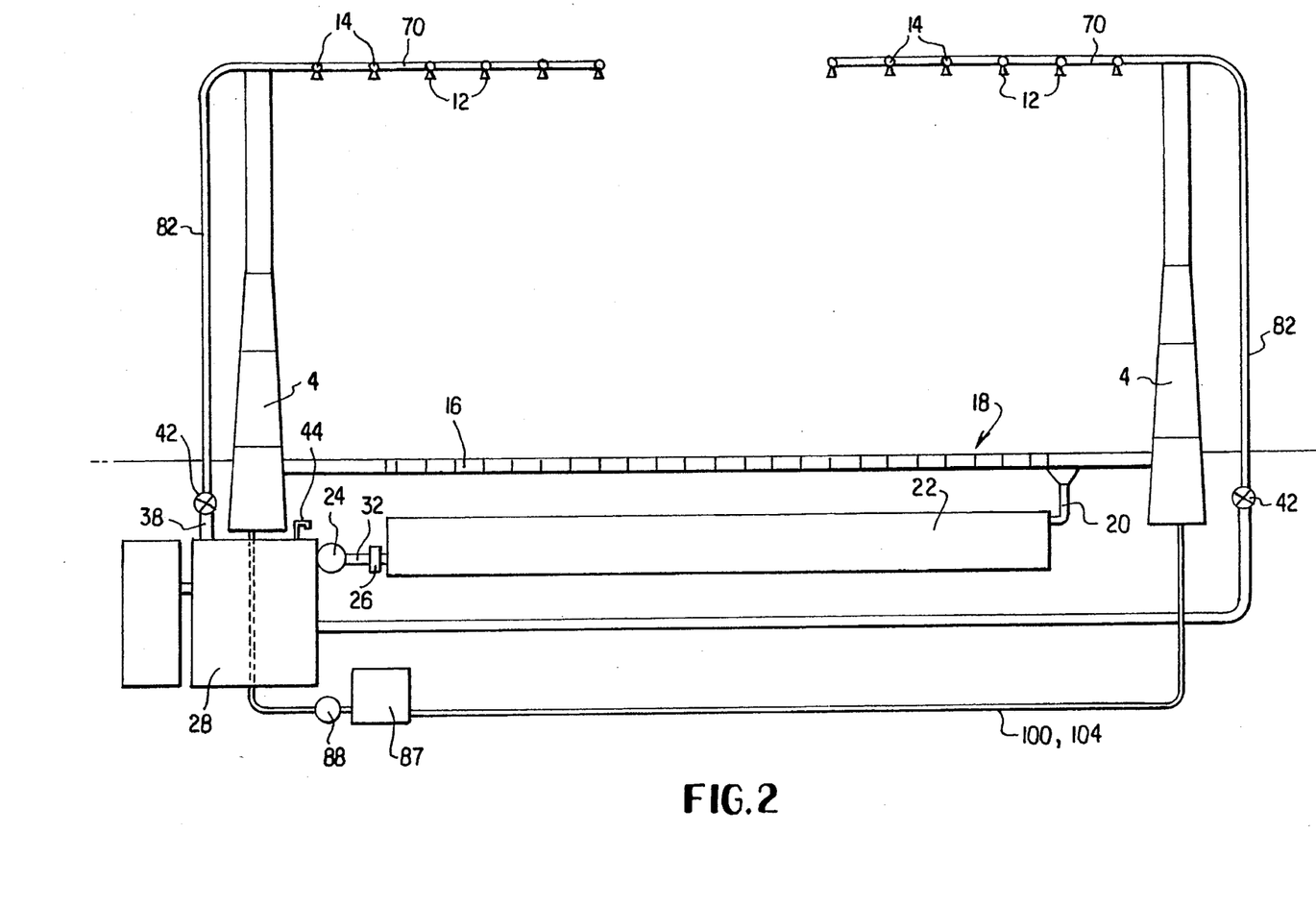
FIG. 2 is a side elevational view showing an embodiment of the , solvent recovery system used in the present invention.

FIG. 2 illustrates the delivery tubes in greater detail. The delivery tubes are equipped with a plurality of conical shaped nozzles 12 which dispense ethylene glycol or some other suitable deicing solution in a conical pattern onto the wings of the aircraft being treated. The operator of the device positions the delivery tubes over the wings of the aircraft by means of a hand held control unit. After use, the delivery tubes are rotated into a position parallel to the taxiway and are lowered into their respective troughs, ready for the next aircraft.

The nozzles on the delivery tubes are controlled by photoelectric means 14 which allow the nozzles to operate only when they are in a position to dispense deicing solution onto the wings of the aircraft being treated. This conserves glycol, and allows for the efficient treatment of aircraft having differing dimensions. After the solution is dispensed, the used solution drips off the wings of the aircraft and is collected in a grate 16 installed in the taxiway. The used solution then proceeds through the solvent recovery system 18.

Figure 3:
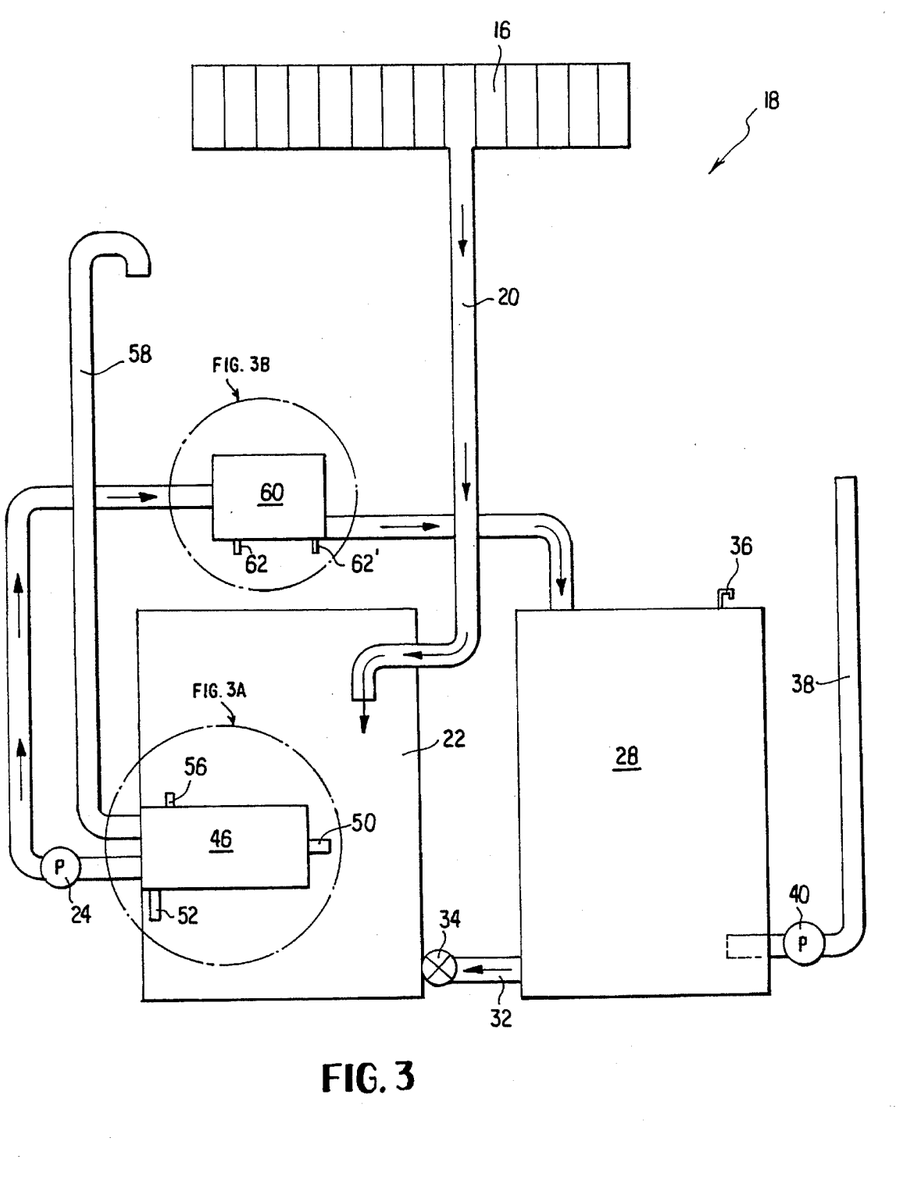
FIG. 3 is a schematic drawing of an embodiment of the solvent recovery system used in the present invention.

As shown in FIG. 2, the solvent recovery system of the present invention is preferably housed underground either directly beneath the taxiway or in the immediate vicinity of thereof. After the solvent is dispensed from the spray nozzles, the diluted, impure solvent collects in the drainage grate and proceeds by way of a drain pipe 20 to the solvent recovery tank 22. The used solvent is concentrated, if necessary, in the recovery tank, and is then pumped by means of a solvent pump 24 through a filter system 26 and into the main solvent supply tank As shown in FIG. 3, the main solvent supply tank may be directly connected to the solvent recovery tank by a conduit equipped with a one-way valve 34. This allows the solvent to be rerouted through the solvent recovery system if necessary.

As FIG. 2 illustrates, the main solvent supply tank may also be equipped with a pressure release vent 36 to prevent excessive pressure build-up in the tank. The main solvent supply tank is further equipped with a fluid line 38 which runs through the interior of the delivery arms and supplies the nozzles with solvent from the main solvent supply tank. Fluid is pumped through the fluid line by means of a solvent pump 40. The flow of solvent to the nozzles is controlled by a solvent valve 42. A secondary makeup tank 44 may optionally be provided for overflow from the main solvent supply tank.

FIG. 3 is a schematic diagram of a solvent recovery system suitable for use in the present invention, and illustrates in greater detail the preferred means by which used, diluted solvent is purified and concentrated for reuse. The mechanical embodiments of the units depicted A and B in FIG. 3 are shown in greater detail in FIGS. 3A and 3B.

Figure 3A:
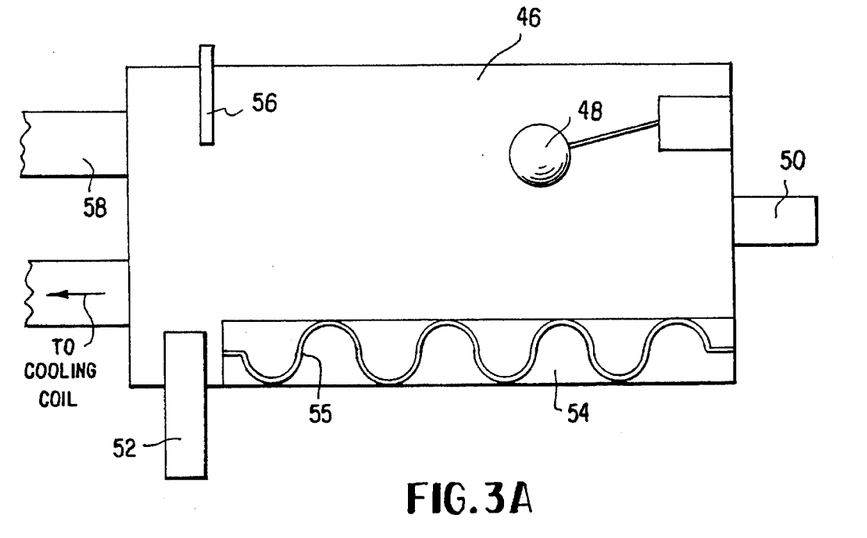
FIG. 3A is a side view in section of the cooling unit used in the solvent recovery system of the present invention.

The solvent recovery tank is equipped with a flash chamber 46, shown in detail in FIG. 3A. The level of solution in the flash chamber is monitored by a float level valve 48 or other suitable level detecting means, which acts in concert with the inlet 50 to prevent further solution from entering the flash chamber when the chamber is full. The purity of the deicing solution entering the flash chamber is monitored by a hydrometer 52, which measures the specific gravity of the solution. When the specific gravity indicates that the solution has become too diluted for further use, a heating unit 54 is activated. The heating unit heats the solution to an appropriate temperature, as indicated by a temperature probe 56, so that the excess water is driven off as steam. The steam escapes into the atmosphere through a vent 58.

Figure 3B:
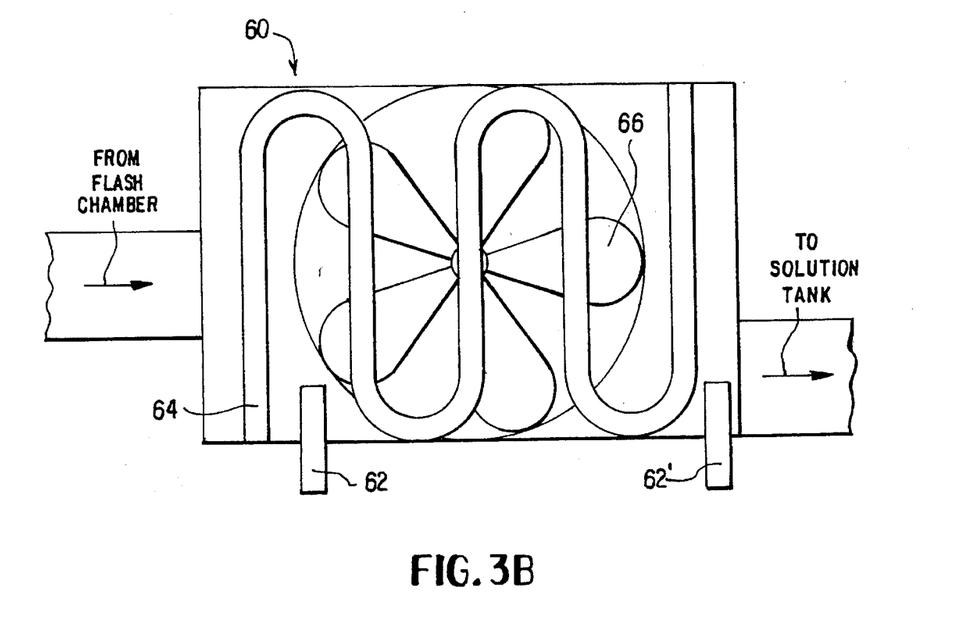
FIG. 3B is a side view in section of an embodiment of the flash chamber used in the solvent recovery system of the present invention.

Before passing to the main solvent supply tank, the solution passes through a cooling unit 60 shown in detail in FIG. 3B. The cooling unit cools the solvent to a predetermined temperature as indicated by second temperature probes 62 and 62'. Preferably, the cooling unit comprises one or more coils 64 and a fan 66. A temperature control valve 68 prevents solution from entering the main solvent supply tank until the solvent is sufficiently cooled. Alternatively, the rate of flow of solvent through the cooling unit may be monitored and controlled so that the solvent is sufficiently cooled when it emerges from the unit.

Figure 4:
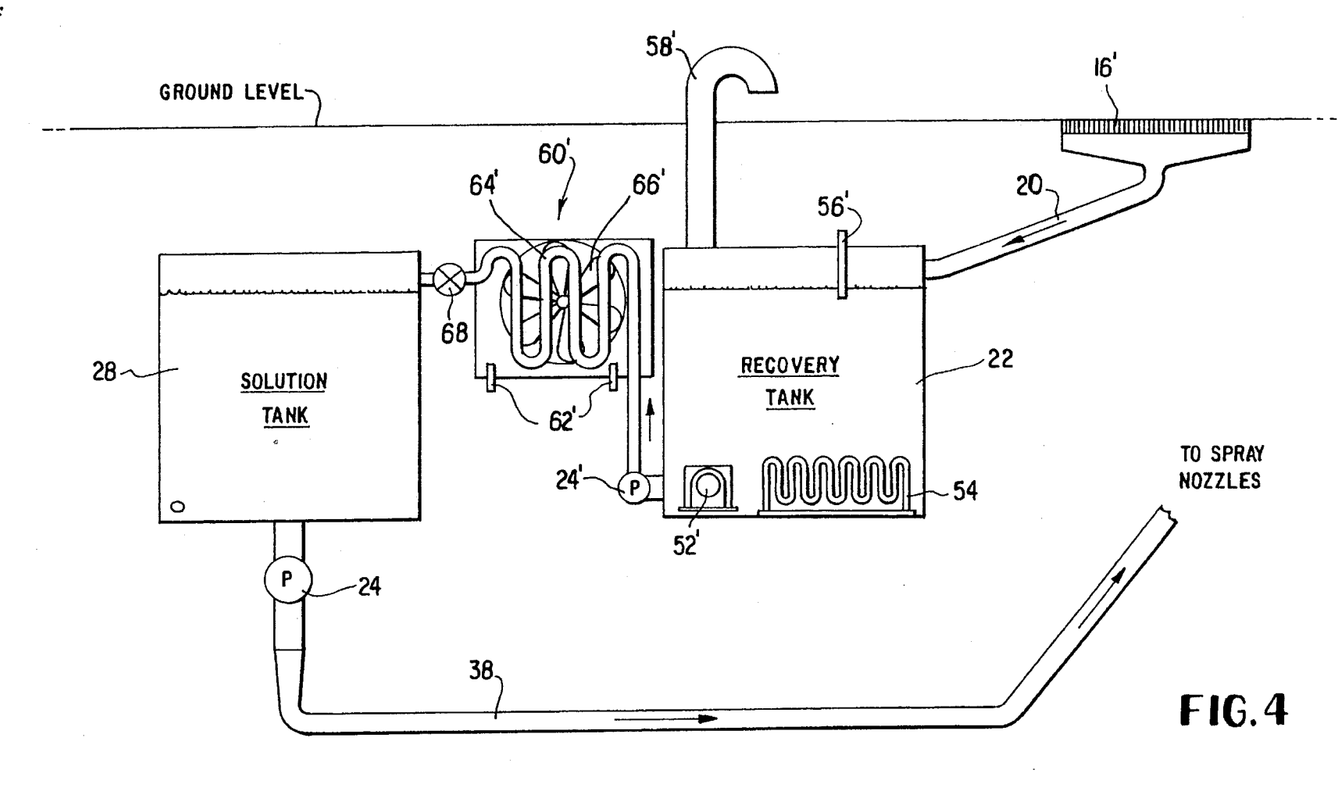
FIG. 4 is a side view in section of an embodiment of the solvent purification system of the present invention.

FIG. 4 shows an alternate, more preferred embodiment of the solvent recovery system. This system differs from the system depicted in FIGS. 2, 3, 3A, and 3B mainly in that the flash chamber is not separate within the solvent recovery tank 22'. Instead, the bottom of the solvent recovery tank is provided with a hydrometer 52' and a heating unit 54'.

In the preferred solvent recovery system, used solvent proceeds from the drainage grate 16' into the solvent recovery tank 22'. The purity of the deicing solution entering the solvent recovery tank is monitored by a hydrometer 52' which measures the specific gravity of the solution. When the specific gravity indicates that the solution has become too diluted for further use, a heating unit 54' is activated. The heating unit may be controlled by a temperature probe 56' or thermostat. The heating unit heats the solution to an appropriate temperature so that the excess water is driven off as steam. The steam escapes into the atmosphere through a vent The concentrated solvent is pumped from the solvent recovery tank and through a cooling unit 60' by means of a solvent pump 24'. The solvent pump cools the solvent to a predetermined temperature as indicated by a second temperature probe 62'. Preferably, the cooling unit comprises a series of coils 64' and a fan 66'. A one-way temperature control valve 68' prevents solution from entering the main solvent supply tank until the solvent is sufficiently cooled.

Figure 5:
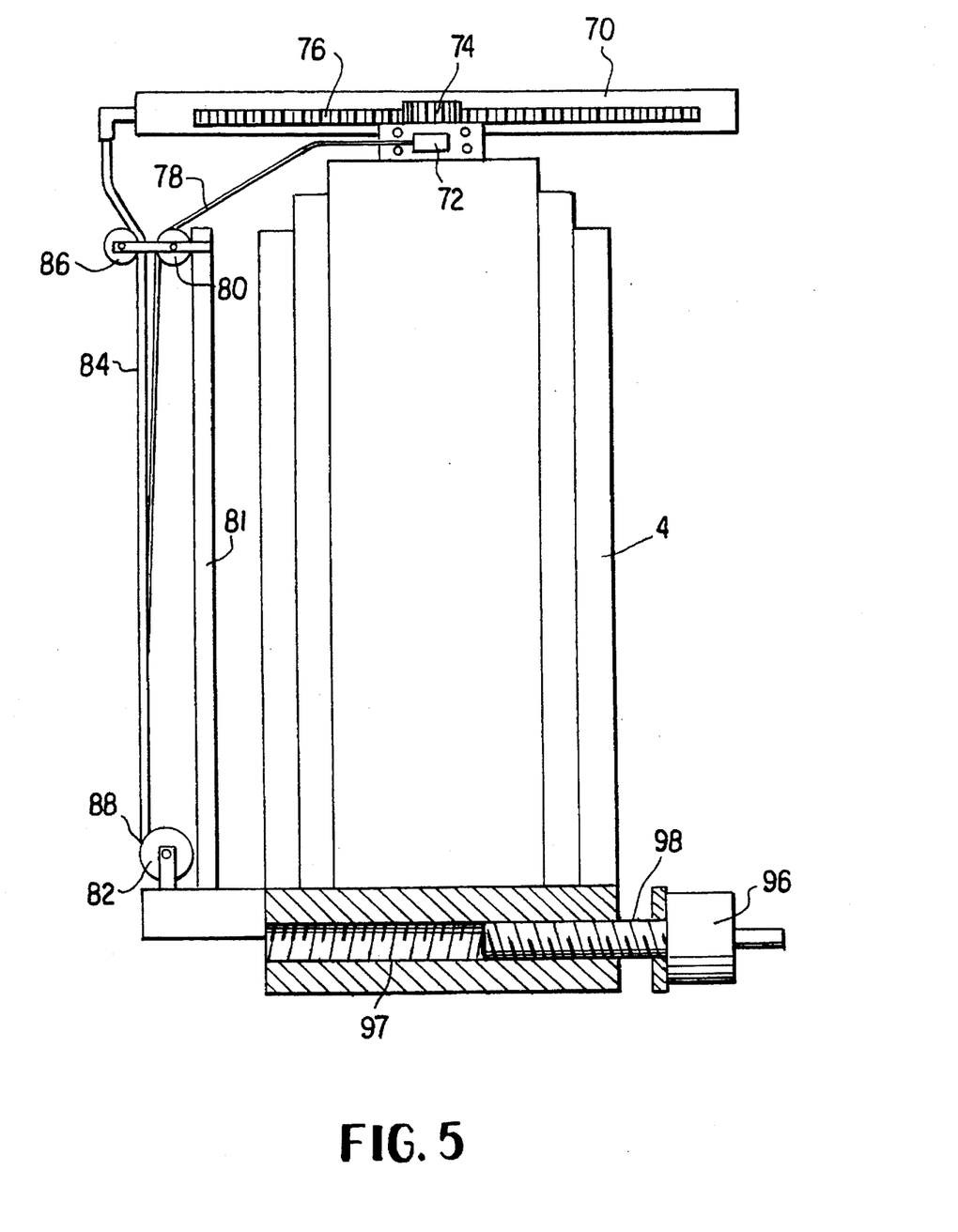
FIG. 5 is a side view, partially in section, of the hydraulic cylinders of the present invention, with FIGS. 5A and 5B showing details of the delivery tube.
Figure 5A:
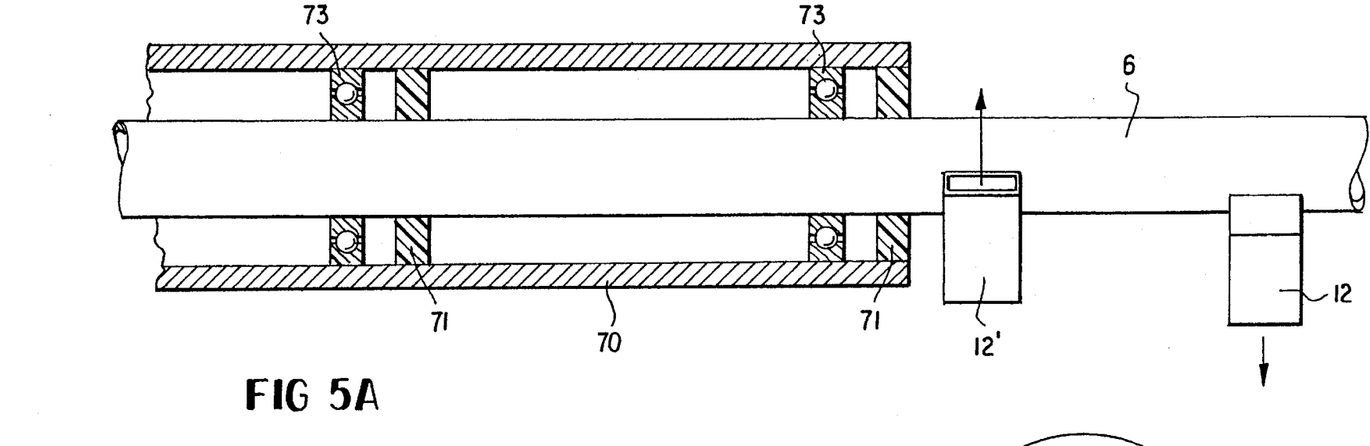

FIG. 5 illustrates the hydraulic cylinders of the present invention. The hydraulic cylinders are equipped with a delivery arm 70 from which the delivery tube extends. The delivery arm is essentially a rigid sleeve which prevents the delivery tube from sagging when it is in its extended position, and also serves to protect the delivery tube in its retracted position. FIG. 5a shows in greater detail the interface between the delivery arm and the delivery tube. The delivery arm is internally fitted with a series of nylon sleeves 71 and bearings 73 which support the delivery tube and keep it from sagging, but which also allow the tube to be smoothly extended and retracted. The delivery arm is further equipped with a channel 75 to accommodate the nozzles when the delivery tube is retracted into the delivery arm.

Referring again to FIG. 5, the delivery tube of the present invention is essentially a gear driven device which is extended and retracted by means of a delivery arm motor 72. The delivery arm motor drives one or more fly wheels 74 whose sprockets engage a drive bar 76 set in the side of the delivery tube, thus causing the delivery tube to extend or retract.

The delivery arm motor is supplied with electrical power through an electrical line 78. The electrical line is supported on one or more electrical line pulleys 80. The electrical line is fed from a coil spool reel 82 which maintains a proper tension in the line by feeding out additional line when the tension in the line increases, as by extension of the hydraulic cylinder, and by taking up line when the tension in the line is reduced.

The hydraulic cylinders are also equipped with a flexible fluid line 84 which, when the device is in use, is in open communication with the main solvent supply tank. The fluid line supplies the delivery tube with deicing solution. The fluid line is equipped with at least one fluid line pulley 86 and a spring-driven take-up spool 88 which maintain proper tension on the fluid line. When the hydraulic cylinder is rotated in a direction which causes tension in the fluid line to increase, the take-up spool reduces the tension by releasing a further portion of the fluid line. Similarly, when the hydraulic cylinder is rotated in a direction which reduces tension on the fluid line, the take-up spool restores proper tension by gathering in more of the fluid line. The fluid line pulley feeds the fluid line into the take-up spool at the proper orientation.

Figure 5B:
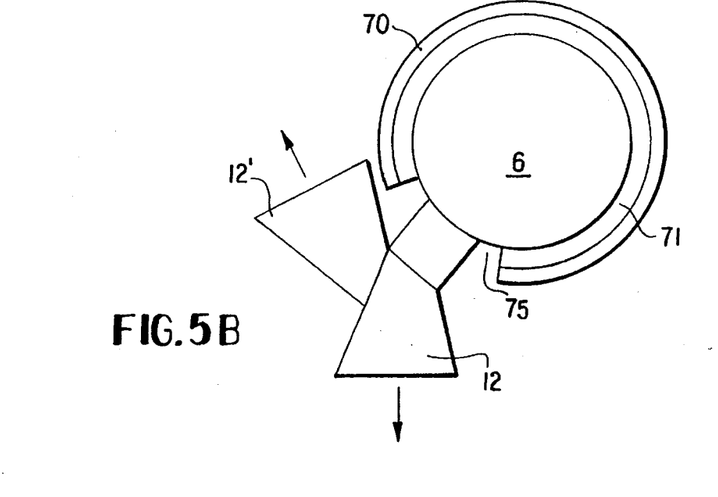

FIG. 5b shows the means by which the device of the present invention is capable of deicing both the top side and the underside of the wings of an aircraft. In one embodiment, the delivery tube is fitted with a series of downward facing nozzles 12 and upward facing nozzles 12'. While any appropriate arrangement of the nozzles may be used, it is preferred that the downward and upward facing nozzles are disposed in a staggered arrangement wherein nozzles of like orientation are spaced 12 inches apart. During deicing of the top side of the wings, only the downward facing nozzles are activated. Similarly, during deicing of the underside of the wings, only the upward facing nozzles are activated.

Figure 6:
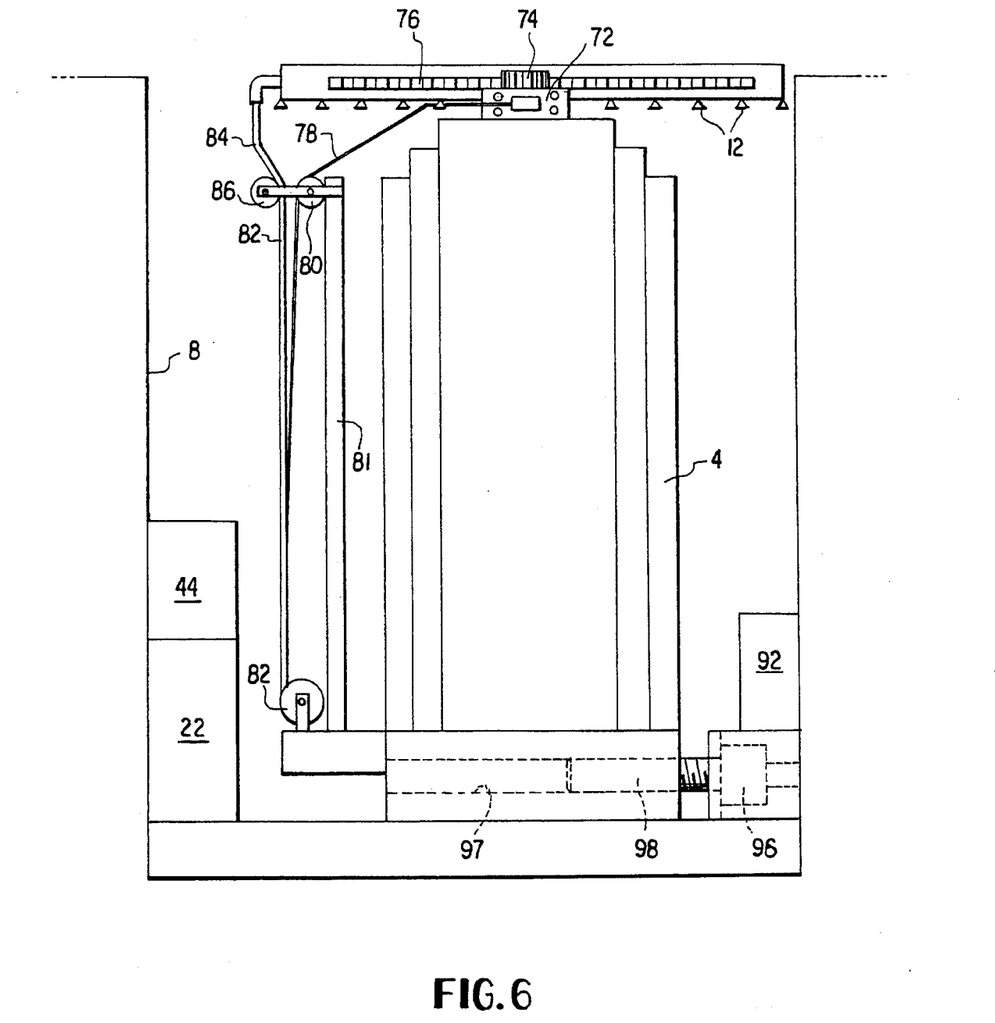
FIG. 6 is a side view, partially in section, showing the placement of a hydraulic cylinder in its cell.

FIG. 6 illustrates the cells into which the hydraulic cylinders are retracted. The cells are cylindrical in shape and are sufficiently deep so that the device may be retracted into the ground in its entirety. The cells are further equipped with a trough to accommodate the delivery arm and the retracted delivery tube. The trough further serves to cradle the delivery arm and protect it from damage.

FIG. 6 also illustrates the mechanism by which the hydraulic cylinders are retracted and extended. Each cell is equipped with a hydraulic reservoir 92 which is preferably located at the bottom of the cell and which works in conjunction with the hydraulic pump to supply pressure to the hydraulic cylinder. The hydraulic pump supplies the hydraulic cylinder with pressure when it is desired to extend the hydraulic cylinder. Similarly, the hydraulic cylinder is retracted by the controlled release of hydraulic pressure.

Rotation of the delivery arm is achieved by a drive motor 96 which drives a worm gear 98. The worm gear operates by engaging a grooved receptacle 97 set in the base of the hydraulic cylinder. The worm gear is capable of rotating in a clockwise fashion to cause the hydraulic cylinder to rotate in a counterclockwise direction, and is also capable of rotating in a counterclockwise fashion to cause the hydraulic cylinder to rotate in a clockwise direction.

As FIG. 6 illustrates, the main solvent supply tank and the solvent recovery tank may be set in the walls of the cell. This arrangement allows easy access and repair.

Figure 7:
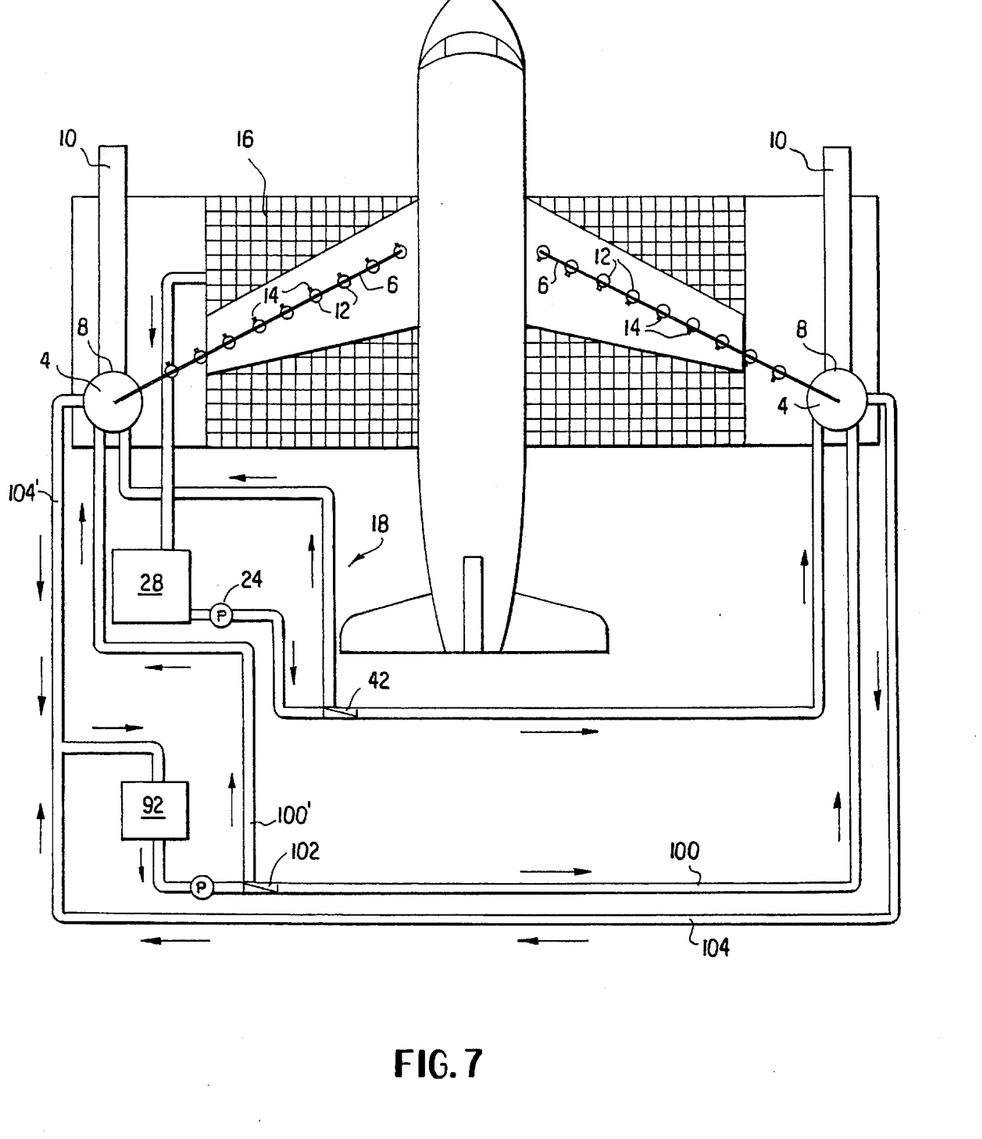
FIG. 7 is a schematic drawing depicting the placement of the supply lines for the solvent purification and hydraulic systems of the/present invention.

FIGS. 2 and 7 schematically illustrate the configuration and placement of the hydraulic supply lines in relation to the solvent supply lines. The hydraulic lines are supplied with hydraulic fluid from the hydraulic reservoir. Hydraulic fluid is pumped through hydraulic supply lines 100, 100' and into the hydraulic cylinders by means of the hydraulic pump 99. The relative hydraulic fluid pressure supplied to the two cylinders is controlled by a hydraulic flow control valve 102. The hydraulic fluid proceeds from the hydraulic cylinders and back to the hydraulic reservoir by means of the hydraulic return lines 104, 104'.

Figure 8:
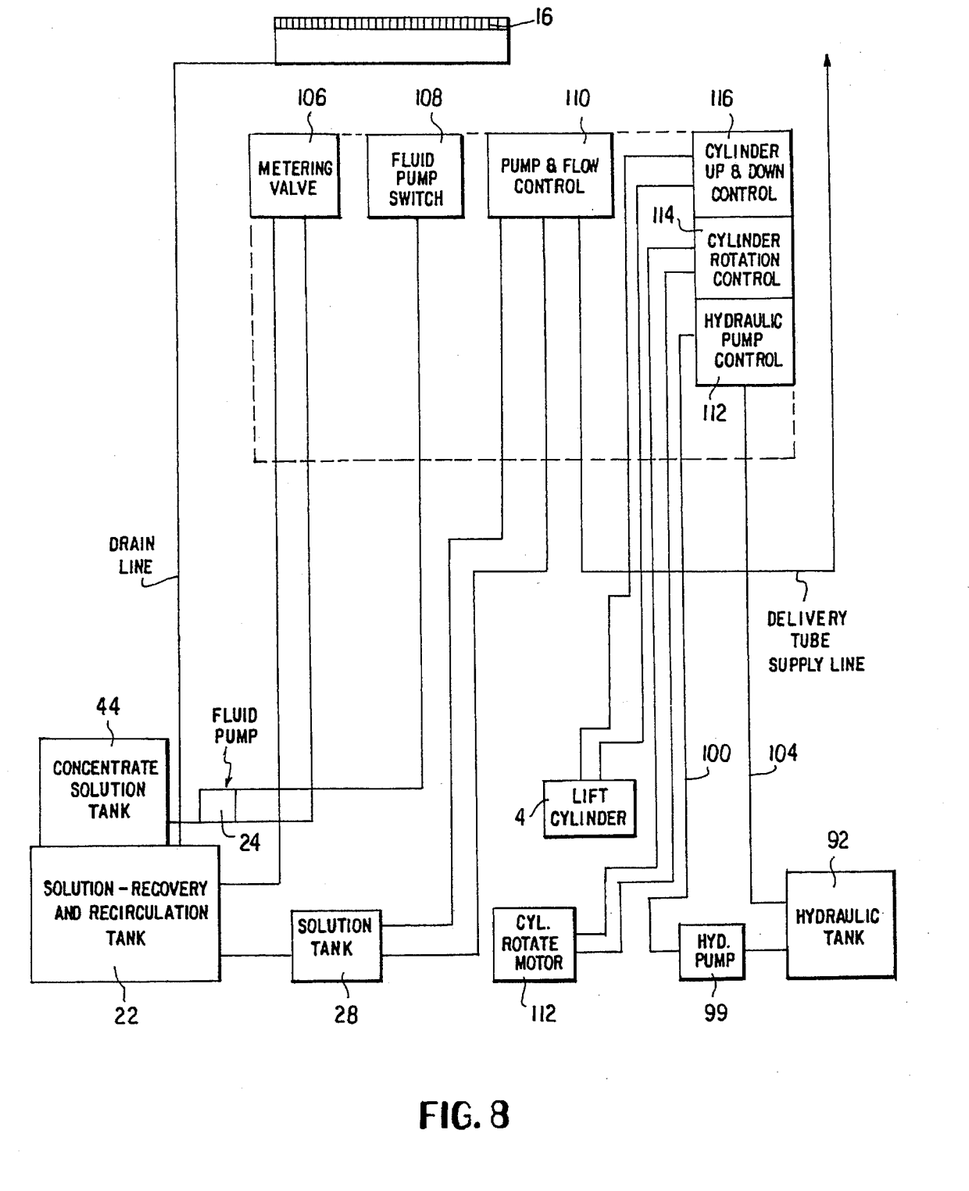
FIG. 8 is a schematic diagram of the control means used to monitor the solvent recovery system and to manipulate the delivery arms.

FIG. 8 is a schematic illustration of the solvent recovery system and the hydraulic system, and the control means by which these systems are manipulated. The solvent recovery system is controlled by a metering valve 106, a fluid pump switch 108, and a pump/flow control 110. The hydraulic fluid system is controlled by a hydraulic pump control 112, a cylinder rotation control 114, and a cylinder up/down control 116.

The metering valve communicates with the pump/flow control to maintain proper fluid levels in the recovery tank, the flash chamber, and the main solvent supply tank. For example, when the float level valve indicates that the fluid level in the flash chamber has reached its maximum predetermined limit, the metering valve operates to seal the inlet into the flash chamber, thereby preventing further solution from entering the flash chamber, while at the same time activating the solvent pump to remove solvent from the flash chamber and into the main solvent supply tank.

The solvent pump switch operates to switch the solvent pump on and off. It is controlled by the pump/flow control, which maintains a proper flow of fluid through the delivery tubes and the solvent recovery system.

The hydraulic cylinders are controlled by the cylinder up/down control and the cylinder rotation control. The up/down control manipulates the hydraulic pump to adjust the vertical orientation of the hydraulic cylinders, while the rotation control manipulates the drive motor to rotate hydraulic cylinder in a clockwise or counterclockwise direction about its vertical axis. The hydraulic pump control manipulates the hydraulic pump to achieve a desired hydraulic pressure throughout the hydraulic system.

The following is meant as a brief description of the preferred method of operating the device of the present invention. It is to be understood that the device may be operated differently without departing from the scope of the invention.

In use, the device of the present invention is situated along the taxiway of an airport. Normally, the device is extended each time an aircraft requires deicing and is thereafter retracted into its cell, although the device may also be kept extended above the ground for prompt servicing of aircraft. However, the device is retracted into the ground during emergency situations, when it is desired to create more room along the taxiway, or when the airport is not in operation.

The device is extended above the ground by means of a telescoping hydraulic cylinder. After an aircraft is positioned for deicing, the operator manipulates the proper buttons on the cylinder up/down control, thereby activating the hydraulic pump. The hydraulic pump supplies hydraulic pressure to the hydraulic cylinder, causing it to extend. The cylinder up/down control can also effectuate the controlled release of hydraulic pressure to cause the hydraulic cylinder to retract.

In this manner, the operator adjusts the hydraulic cylinders until they are at the appropriate height.

Next, the operator manipulates the drive motor through the cylinder rotation control until the delivery tube is at a proper angle to the wing. The delivery arm motor is then activated to extend the delivery tube from the delivery arm.

When the photoelectric means indicates that a particular nozzle has come into proper orientation with respect to the aircraft to dispense deicing solution onto the aircraft's wings, that nozzle is activated and begins to dispense deicing solution. The nozzle continues to dispense solution until the photoelectric means indicates that the nozzle is no longer situated to dispense the solution onto the wings of the aircraft. Excess solution drips off of the aircraft and collects in the grate, from which it is recycled through the solvent recovery system.

Modifications within the scope of the appended claims will be apparent to those of skill in the art.

We claim:

1. An apparatus for dispensing a deicing solution onto the wings of an aircraft, comprising:

a substantially rigid hose equipped with dispensing means for dispensing a deicing solution onto the wings of an aircraft;

a rigid sleeve for supporting said hose in a substantially horizontal orientation with respect to the ground;

extending means for retractably extending said hose between a first position wherein said hose is housed substantially within said sleeve and a second position wherein said hose is substantially extended from said sleeve;

housing means for housing said hose and said sleeve underground;

telescopic support means for supporting said sleeve in a horizontal orientation; and adjusting means for adjusting the height of said support means;

wherein said sleeve is equipped with an aperture along its length, and wherein said dispensing means is disposed within said aperture when said hose is retracted into said sleeve.

2. The apparatus of claim 15, wherein said extending means and said adjusting means are coordinated so that said extending means retracts said hose into said sleeve before said support means retracts said sleeve into said housing means.

3. The apparatus of claim 1, wherein said adjusting means retracts said support means to a position in which said sleeve is housed substantially entirely within said housing means.

4. The apparatus of claim 3, wherein said housing means is disposed entirely underground.

5. The apparatus of claim 1, wherein said housing means is disposed along the taxiway of an airport.

6. The apparatus of claim 1, further comprising:

photoelectric means for operating in cooperation with said adjusting means and said extending means to position said support means in a predetermined orientation with respect to the wings of an aircraft.

7. The apparatus of claim 1, further comprising:

rotating means for rotating said support means around a vertical axis.

8. The apparatus of claim 1, further comprising:

activating means for activating said dispensing means; wherein said activating means activates said dispensing means only when said dispensing means is in a position to dispense the deicing solution onto the wings of the aircraft, and wherein said activating means deactivates said dispensing means otherwise.

9. The apparatus of claim 1, further comprising:

recovery means for recovering and recycling used deicing solution.

10. The apparatus of claim 9, further comprising:

concentrating means for concentrating and purifying used deicing solution.

11. The apparatus of claim 10, wherein said concentrating means operates to concentrate and purify the used deicing solution only when the specific gravity of the deicing solution falls outside of a predetermined range.

12. An apparatus for dispensing a deicing solution onto the wings of an aircraft, comprising:

a substantially rigid hose equipped with a plurality of nozzles for dispensing a deicing solution onto the wings of an aircraft;

a rigid sleeve for supporting said hose in a substantially horizontal orientation with respect to the ground;

extending means for retractably extending said hose between a first position wherein said hose is housed substantially entirely within said sleeve and a second position wherein said hose is extended from said sleeve;

housing means for housing said hose and said sleeve underground;

telescopic support means for supporting said sleeve in a horizontal orientation; and adjusting means for adjusting the height of said support means;

wherein said sleeve is equipped with a first longitudinal aperture for accommodating said plurality of nozzles when said hose is retracted into said sleeve.

13. The apparatus of claim 12, wherein said sleeve is provided with a second longitudinal aperture, and wherein said hose is provided with a plurality of ridges in the vicinity of said second aperture.

14. The apparatus of claim 13, further comprising:

engaging means for rotatably engaging said ridges, thereby causing said hose to extend from, or retract into, said sleeve.

15. The apparatus of claim 14, wherein said engaging means is a fly wheel.

16. The apparatus of claim 12, wherein said hose and said sleeve are essentially cylindrical in shape.

17. An apparatus for deicing the wings of an aircraft, comprising:

a substantially rigid conduit equipped with a plurality of nozzles for dispensing a deicing solution onto the wings of an aircraft;

a hose, in open communication with said conduit, for connecting said conduit to a supply of deicing solution;

a telescopic cylinder for supporting said conduit above the ground;

adjusting means for adjusting the height of said telescopic cylinder;

a rigid, cylindrical sleeve, transversely mounted on said cylinder, for supporting said conduit in a substantially horizontal orientation with respect to the ground;

extending means for retractably extending said conduit between a first position wherein said conduit is housed substantially entirely within said sleeve and a second position wherein said conduit is extended from said sleeve, said extending means including a motor driven flywheel which extends through a first longitudinal aperture in said sleeve and which rotatingly engages a series of notches on the surface of said conduit; and housing means for housing said telescopic cylinder underground;

wherein said sleeve is equipped with a second longitudinal aperture for accommodating said nozzles when said conduit is retracted into said sleeve.

18. The apparatus of claim 17, wherein said adjusting means comprises a worm gear.

* * * * *